G. H. CURTISS.
FLYING MACHINE.
APPLICATION FILED SEPT. 14, 1912.
1,104,036.
Patented July 21, 1914.
5 SHEETS—SHEET 3.
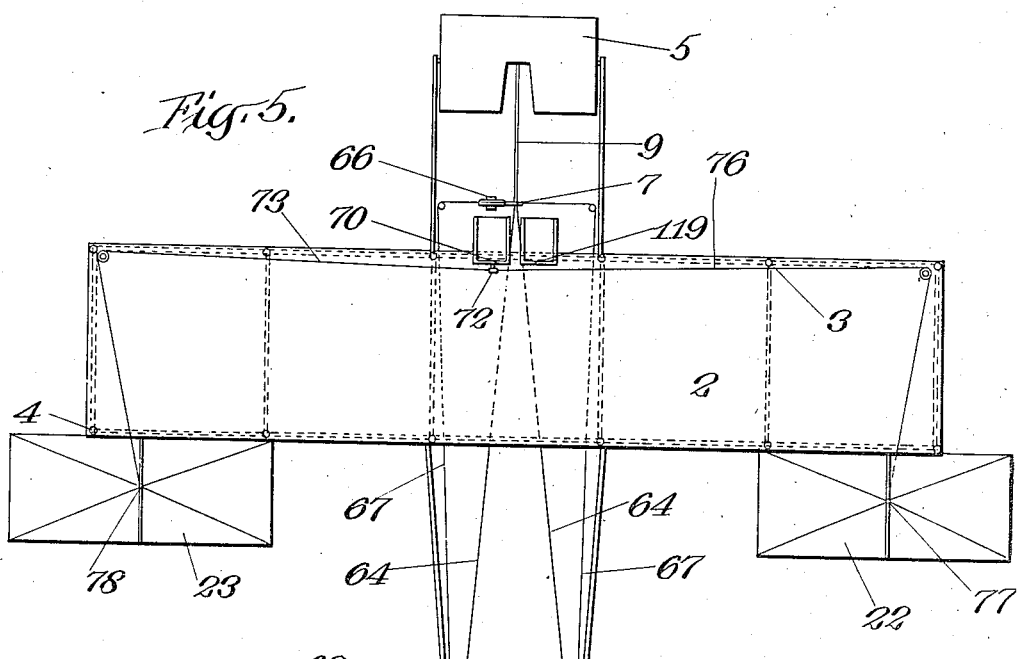
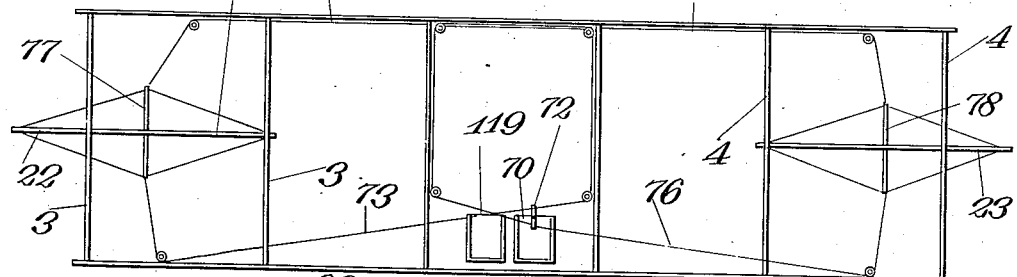
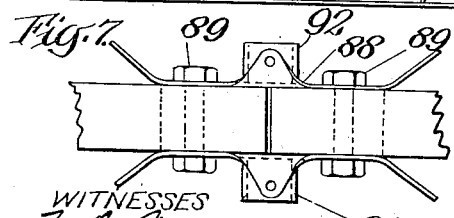
WITNESSES
INVENTOR.
Glenn H. Curtiss
ATTORNEY G. H. CURTISS.
FLYING MACHINE.
APPLICATION FILED SEPT. 14, 1912.
1,104,036.
Patented July 21, 1914.
5 SHEETS—SHEET 4.
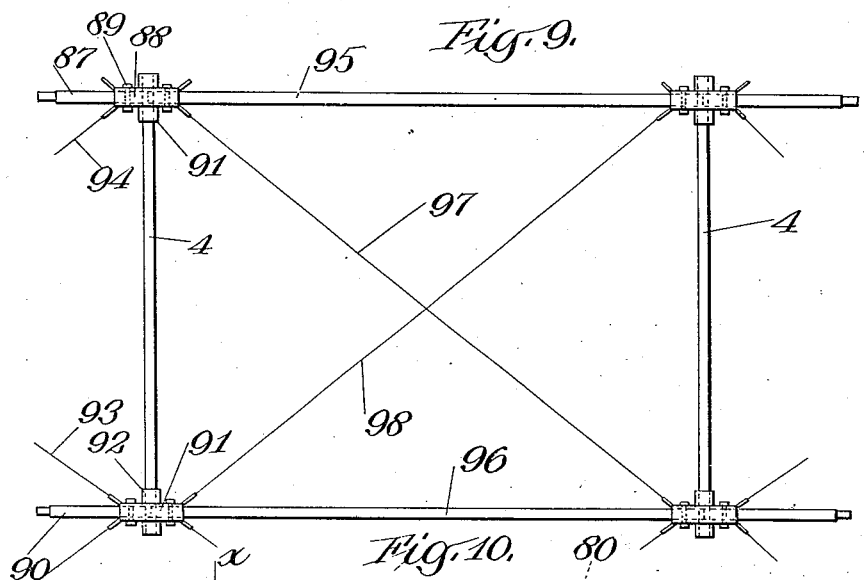
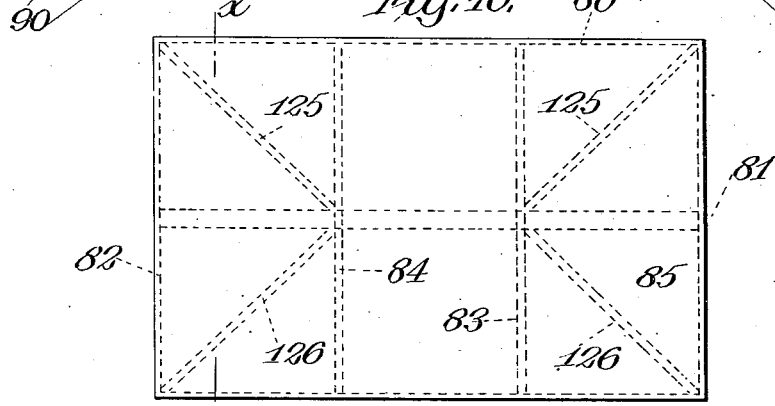
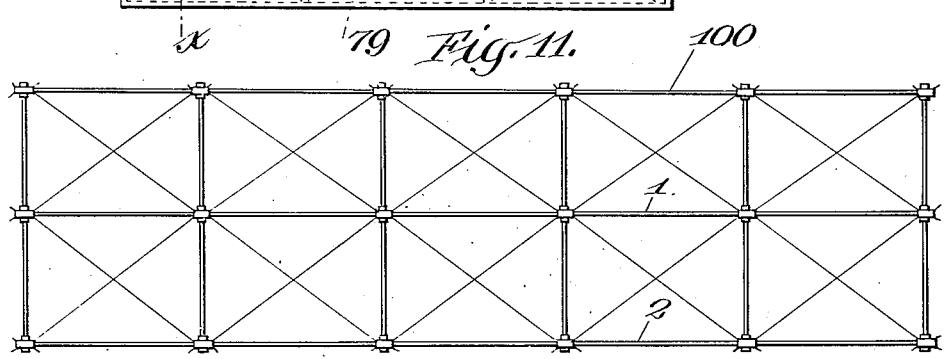
Witnesses
F. O. Auman
F. Jackson
Inventor
Glenn H. Curtiss
by Knoell & Neal
Attorney

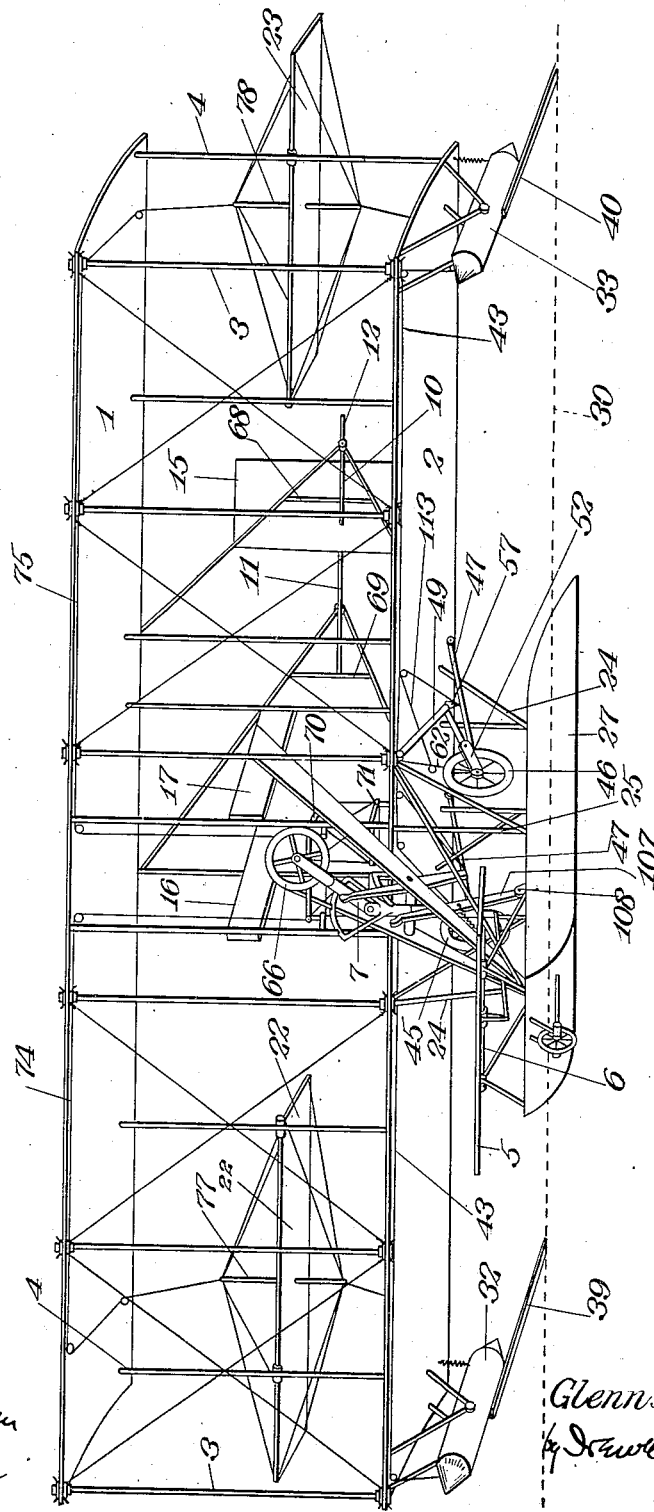

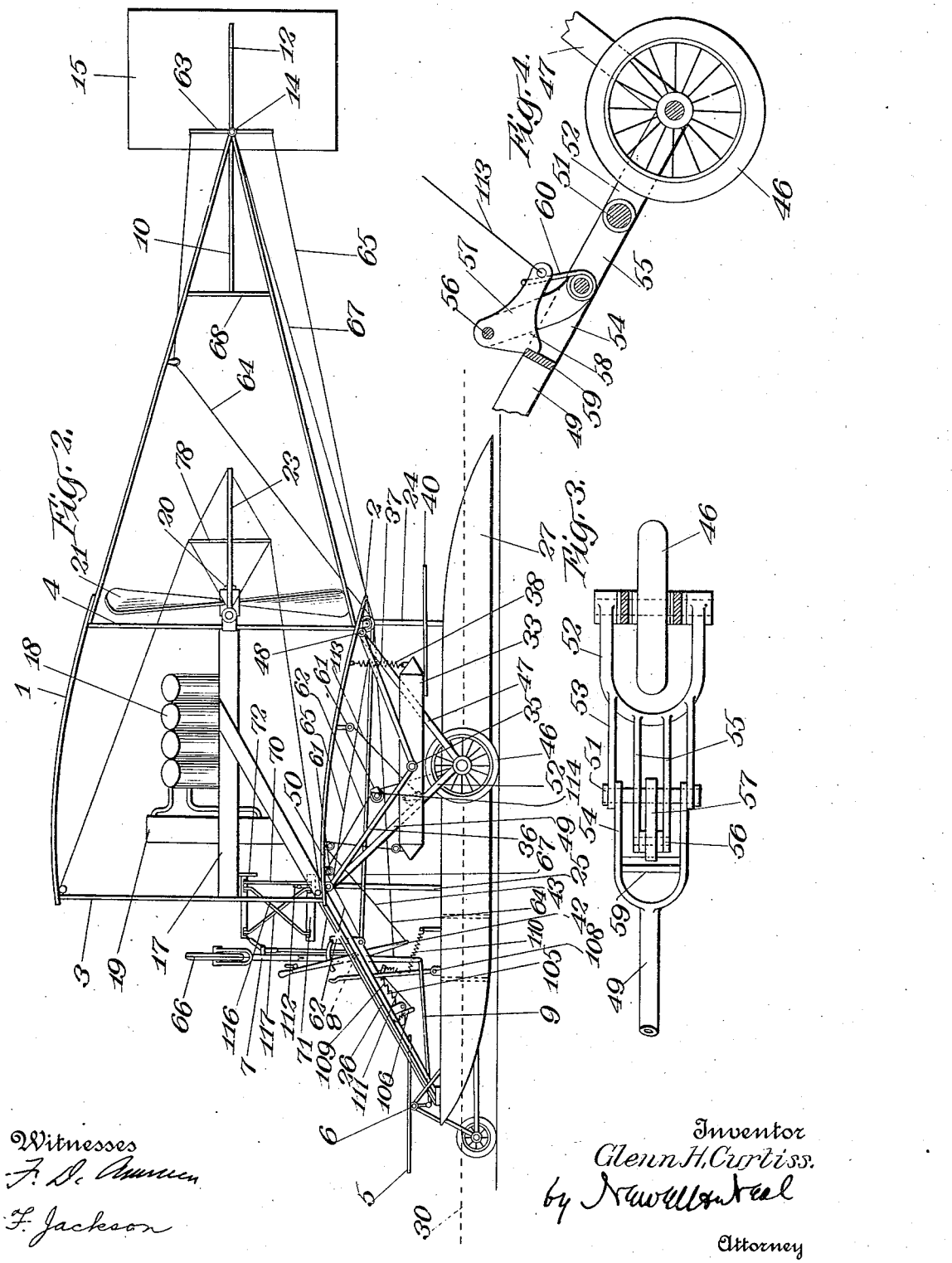

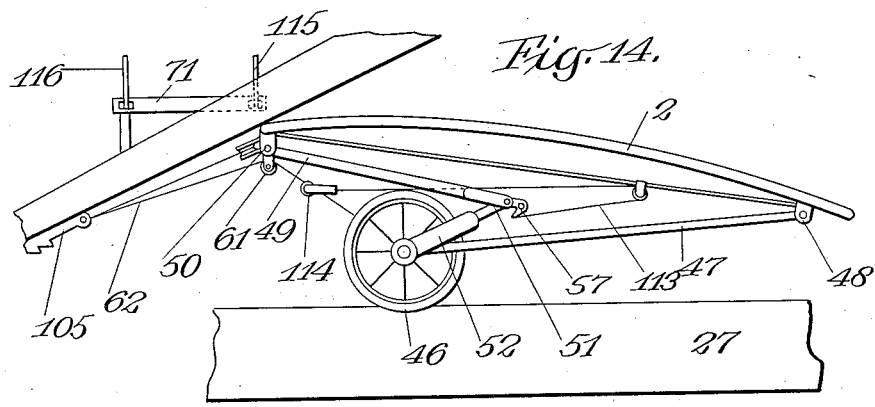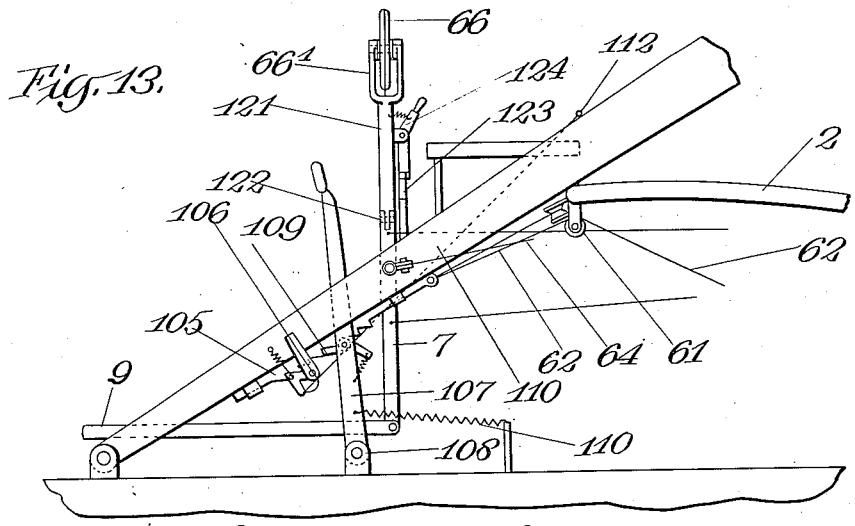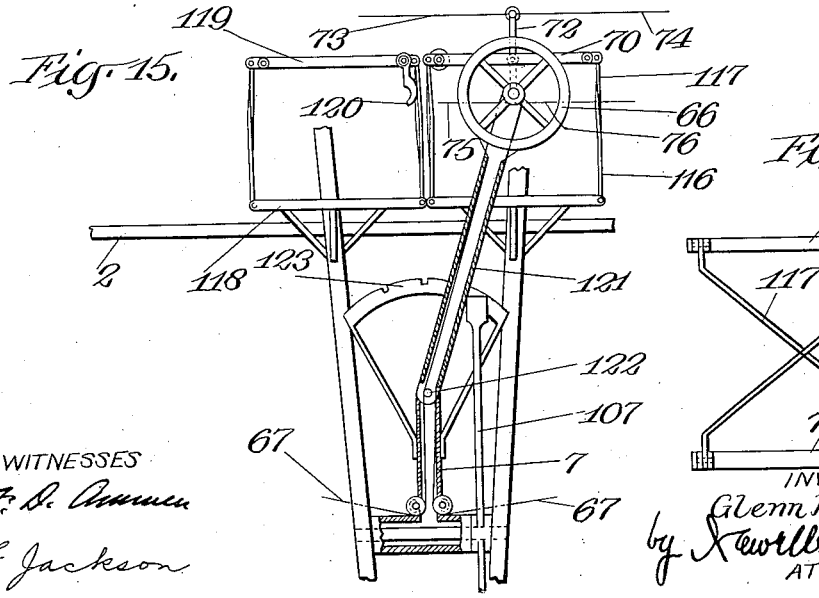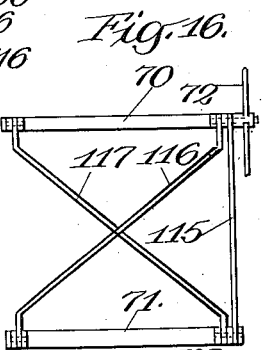

UNITED STATES PATENT OFFICE.

GLENN H. CURTISS, OF HAMMONDSPORT, NEW YORK.

FLYING-MACHINE.

1,104,036.  Specification of Letters Patent.  Patented July 21, 1914.

Original application filed August 22, 1911, Serial No. 645,340. Divided and this application filed September 14, 1912. Serial No. 720,355.

*To all whom it may concern:*

Be it known that I, GLENN H. CURTISS, a citizen of the United States, residing at Hammondsport, New York, have invented certain new and useful Improvements in Flying-Machines, of which the following is a clear, full, and exact description.

My invention relates to heavier-than-air flying machines, and has for its object the improvement of various details of construction and combination of parts applicable to both aeroplanes and hydro-aeroplanes.

The present case is a division of my present co-pending application 645,340.

My invention will be set forth in the claims.

In the drawings which show the preferred form of my invention, Figure 1 is a perspective view from the front, parts having been omitted in order not to complicate the drawings; Fig. 2 is a side elevation; Figs. 3, 4 and 14 are details of the folding wheel construction; Fig. 5 is a top plan view of the machine; Fig. 6 is a front view showing the arrangement of the mechanism for operating the ailerons; Figs. 7 and 8 are rear and side elevations of a socket; Fig. 9 is a front elevation of a portion of the superposed surfaces; Fig. 10 a plan view of one of the panels; Fig. 11 a front elevation of a machine having three superposed surfaces; Fig. 12 is a sectional detail of Fig. 10 taken on the line X—X; and Figs. 13 15 and 16 are enlarged details.

In the drawings I have shown an aeroplane or heavier-than-air machine provided with floating means 27 to support the same on the water, and other constructions by which this result may be accomplished. The aeroplane proper is substantially the ordinary Curtiss machine which is now well known. It comprises an aeroplane surface sufficient to support the whole machine in the air and which is preferably split up into two superposed areas or surfaces 1 and 2 connected by spacing posts 3 and 4.

5 is a front substantially-horizontal rudder pivoted at 6 to the frame and rockable on its pivot by a manually movable device under the control of the operator, such as a lever 7 located in front of the operator's seat and pivoted at 8 to rock back and forth.

9 is a connecting bar pivoted at its ends to the elevating plane 5 and to the lower end of the said post 7.

10 and 11 are fixed horizontal surfaces at the rear, and 12, 13 are substantially horizontal elevating rudders pivoted to the fixed surfaces at 14.

15 is a vertical rudder pivoted to the fixed surface.

16, 17 is the bed for the engine 18. This engine may be the well known eight cylinder 50 horse-power four cycle Curtiss engine, the cylinders being arranged in V position with radiator 19, tail shaft 20, and propeller 21 having a radius of 3½ feet and pitch of 6 feet.

In order to prevent either side of the planes from coming in contact with the water during travel through the water, I have preferably pivotally mounted at each side thereof wing pontoons 32, 33 having trailing blades 39 and 40 respectively acted on by the rush of water at positive angles of incidence in order to give a lift to either side which may be depressed, also more particularly described in my co-pending application.

In order that the operator may, if he desires, vary the inclination of the floats and blades, I have provided a lever 42 connected to a wire 43 leading to each float, so that by movement of said lever from the position shown in Fig. 2 to that shown in Fig. 1, the floats, and with them the blades, may be inclined upward. Movement of the lever in the reverse direction allows the floats and blades to return to the horizontal position shown in Fig. 2 where they will exert slight head resistance to the rush of air. When the machine is at rest on the water, the floats may be allowed to take the horizontal position and prevent either side of the machine from dipping into the water. When the machine is started, the operator may throw his lever to incline the floats and blades, as shown in Fig. 1, and they will then act as an automatic stabilizing means. When the machine gets into the air the operator causes them to return to the horizontal position.

45 and 46 are wheels constituting the preferred form of means for supporting the machine in travel in contact with the earth, if the machine is desired to run over the earth also. They are hung from the machine and project slightly below the lower surface of the boat, as indicated in Fig. 2. In order that they may exert less resistance when the machine is moving through the water, I have provided means under the control of the operator for raising the wheels out of the water when the machine is floating, and for depressing the same at will. In the preferred construction, 47 is a brace pivoted at 48 to the frame of the machine, and 49 is another brace pivoted at 50 to the frame, and at 51 pivoted to a short arm 52. A locking device shown in Figs. 3 and 4 in detail operates to hold the wheels in their depressed position shown in Fig. 1. As shown in Figs. 3, 4 and 14, the wheel is pivoted to the U-shaped frame 52 having projections 53 pivoted to the U-shaped end 54 of the brace 49. Bent arms 55 fixed to the frame 52 carry pivoted to them at 56 a locking detent 57, which has a catch-nose 58 engaging a bar 59 on the U-shaped frame 54.

60 is a spring normally holding the latch in the position shown in Fig. 4. The preferred mechanism for raising the wheels comprises a slidable rack bar 105 (see Figs. 13 and 14) engaged by a spring-pressed detent 106.

62 is a wire connected to the bar and running to the axle of the wheel, being led over suitable pulleys such as 61.

107 is a foot lever pivoted to the boat at 108 and carrying a spring dog 109.

110 is a spring to draw lever 107 backward. As the foot lever is reciprocated it forces the bar 105 downwardly, being held by detent 106 at each reciprocation, drawing on wire 62 and collapsing the frame 47, 49, 52 to the raised position shown in Fig. 14. The holding latch 106 may be tripped by a wire 111 and handle 112 adjacent to the operator's seat. In order to release lock 57, a wire 113 runs therefore to a pulley 114 loose on wire 62. This latter is slack when the wheels are down and locked, and as the slack is taken up it draws on wire 113, unlocking latch 57 just before wire 62 becomes taut. Of course the other wheel is provided with the same construction, the wires 62 of both wheels being connected to rack bar 105. Releasing the detent 106 before the machine comes out of the water allows the weight of the parts and the resistance offered by the water to throw the wheels back to the locked position shown in Figs. 1 and 4. The machine may then travel out of the water onto the land and over the same without the resistance which would be exerted by the boat 27 if in contact with the earth.

The elevating rudders 5, 12 and 13 are pivoted on transverse axes 6 and 14. Each of the rear rudders carries a post 63 extending above and below it, and from the upper end of each post a wire 64 leads to the lever 7 below its pivot, and from the lower end of each post 63 a wire 65 leads to the lever 7 above its pivot. Consequently when the lever 7 is pulled backward toward the operator, the connecting bar 9 causes the elevating rudder 5 to be presented to the wind at a positive angle of incidence and both rudders 12 and 13 to be tilted up to a negative angle of incidence. Consequently the action of the air on the rudder 5 tends to elevate the front of the machine, and the action of the air on the rudder 12 and 13 tends to depress the rear of the machine. Obviously movement of lever 7 in the opposite direction has the contrary effect. The rudders 12 and 13 are preferably cut away as shown in Fig. 5, and pivoted between them and to the horizontal fixed surface is a vertical rudder 15 which swings between the rudders 12 and 13. The vertical rudder may be operated from a steering wheel 66 mounted on lever 7 and connected to the vertical rudder by tiller ropes 67, passing up through the hollow lever 7, arm 121 and around said wheel 66 as shown in Fig. 15.

The fixed surfaces 10 and 11 are substantially V-shaped but joined together to provide a fixed pivot for the vertical rudder and are fixed at their rear and immovably held at their apexes by the connecting struts 68 and 69. This construction prevents the "whipping" which might occur if the V-shaped space between them were not provided.

The ailerons 22, 23 are preferably located substantially midway between the surfaces 1 and 2, and therefore are not so much affected by the deflection of the air currents caused by the impingement of the air on said surfaces 1 and 2, as said ailerons would be if they were hung directly to the rear edge of said surface. In the present embodiment I have shown them as pivoted to the rear posts, but this location is not essential, although such location is preferable as the wedging effect of the air is less at this position than would be the case if they were moved forward and pivoted to the front posts. I, however, do not desire to be limited to either such location of the ailerons. In order to provide means under the control of the operator for throwing these ailerons to opposite angles of incidence, I have provided connections therefrom by which the operator may tilt them in either direction, and preferably simultaneously in opposite directions. This in the embodiment shown comprises a laterally movable device, such as a shoulder frame 70, pivoted to the seat 71 by connecting bars 115, 116, 117 by which the frame may be moved from side to side, and carrying pivoted to it a rocking arm 72 with wires or ropes 73, 74 and 75, 76, said wires being attached to the projections or posts 77, 78 on the ailerons. It will be obvious that moving the shoulder frame in either lateral direction will tilt the ailerons in opposite directions.

The ailerons, as well as the rear rudders 12 and 13, are stiffened by wires running from each end of the posts or projections thereon to the corners of said surfaces. In order to allow the control mechanism which operates the ailerons and vertical and horizontal rudders to be shifted to or from a passenger, I have provided a construction by which this may be done instantaneously when in flight. In the preferred construction illustrated the passenger is provided with a seat 118 and laterally movable shoulder frame 119 similar to that on seat 71, but normally unconnected to frame 70. In order to connect the frame 119 to the aileron wires so that they may be operated from frame 119 I have provided a latch 120 which may be snapped over frame 70 as shown in dotted lines. This may be done almost instantaneously, and the passenger may then operate the ailerons. In order to pass the control for the vertical and horizontal rudder to the passenger I prefer to rotatably mount the steering wheel 66 within a fork on arm 121 pivoted to lever 7 at 122 so that the wheel may be passed across from one seat to the other. It may be locked in either position by a quadrant 123 fixed to lever 7 and a spring latch 124 on arm 121. This construction has been used with perfect success in transferring control of the machine from one operator to another during free flight in the air. Obviously the mode of operation of the machine is precisely the same from either seat.

In order to provide a construction of the surfaces 1 and 2 which will allow the same to be inexpensively constructed and easily set up and taken down, I prefer to build said surfaces of similar panels, with sockets by which a panel may be easily fastened to or detached from an adjacent panel, and the sockets provided with means for attaching the spacing posts to them in order that any number of surfaces may be easily superposed, and in fact any form of machine made without materially weakening the construction. The machine shown is built up of separate panels, one of which is shown in Fig. 10, comprising a frame having a front bar 79, a rear bar 80, side bars 81 and 82 and ribs 83, 84. Cloth or any other equivalent air-resisting material 85 is stretched over top and bottom of the frame and may be tacked to the bars and ribs. 125, 126 are strengthening braces to prevent lateral distortion.

In order to detachably hold the panels, I have provided sockets such as shown in Figs. 7, 8 and 9, made of metal bent into a substantial U-shape. As seen in Fig. 9, the panel 87 is slipped laterally into the socket 88 and fastened by passing the bolt 89 through the socket and side bar. The panel 90 is slipped into the similar socket 91 and similarly fastened. The spacing post 4 is slipped into the sockets 91 and 92, and the diagonal trussing wires 93, 94 attached to the diagonal ears of the socket. If two additional panels are to be provided in the same plane as the other panels, the similar panels 95, 96 may be slipped into the open ends of the sockets and similarly fastened and trussed by the wires 97, 98. The sockets 125 at the rear may be the same, or, if it is desired to extend the surfaces beyond the rear posts, they may be made in two parts by merely cutting off the connecting metal as shown by the dotted line $y$—$y$ in Fig. 8. If it is desired to make a machine of three superposed surfaces, or to add or omit any desired panels, it is very easy to do so. For example as shown in Fig. 11, an additional surface 100 has been added above the other two by adding five similar panels with sockets and posts and trussing wires. With such construction the machine may be easily assembled and knocked down, and the cost of construction is materially reduced.

I am aware that various modifications may be made in my invention without departing from the spirit of the claims, and I therefore do not desire to be limited to the preferred embodiments herein shown in the drawings.

What I claim is:

1. A heavier-than-air flying machine, a movable equilibrium-restoring device at each side of the machine, a movable frame extending close to and adapted to be moved by the swinging of the operator's body, connections therefrom to said equilibrium restoring devices to operate the same by movement of said body frame, a second laterally movable frame for another operator, and means for placing said second frame in or out of operative relation to said equilibrium-restoring devices at any time.

2. A heavier-than-air flying machine, a movable equilibrium-restoring device at each side of the machine, a laterally movable frame extending close to each side of the operator's body, connections therefrom to said equilibrium restoring devices to operate the same by movement of said frame in either direction, a second laterally movable frame for another operator normally unconnected with said equilibrium restoring devices, and means for operatively connecting said latter frame to said equilibrium restoring devices during flight.

3. A heavier-than-air flying machine, a movable equilibrium-restoring device at each side of the machine, a pair of seats, a pivoted shoulder frame partially embracing the operator's body and mounted adjacent said seat to swing laterally, connections from said shoulder frame to said equilibrium-restoring devices, a second swinging shoulder frame mounted adjacent the second seat for the second operator, and detachable means for connecting said frames together.

4. In a heavier-than-air flying machine in combination, a pair of seats, a horizontal elevating rudder, a lever and connections to said rudder for operating the same, a vertical steering rudder, a wheel or lever for operating the same mounted on said first lever and having connections to said steering rudder, and means permitting said wheel (while operatively connected) to be moved from one seat to the other during flight, and locking means for locking said wheel in either position.

5. In a heavier-than-air flying machine in combination, a pair of seats, a horizontal elevating rudder, a lever and connections to said rudder for operating the same, a vertical steering rudder, a wheel or lever for operating the same, and having a supporting arm pivoted to said first lever to swing at right angles to the movement of said first lever, whereby said wheel while operatively connected may be moved from one seat to the other during flight and means for locking said wheel supporting arm in either position.

6. In a heavier-than-air flying machine in combination, a pair of seats, a horizontal rudder, a lever and connections to said rudder for operating the same, a steering rudder, a wheel or lever for operating the same mounted on said lever and having connections to said steering rudder, and means permitting said wheel to be moved from one seat to the other during flight.

7. In a heavier-than-air flying machine in combination, superposed aeroplane-surfaces comprising a frame made up in detachable sections, U-shaped socket members adapted to receive the edges of two adjacent sections in the open side thereof, and vertical posts between said aeroplane-surfaces connected to said socket members for spacing the same apart.

8. In a heavier-than-air flying machine in combination, superposed aeroplane-surfaces comprising a frame made up in sections, U-shaped socket members with the open side facing horizontally adapted to receive the edges of two adjacent frame sections therein, means for detachably fastening the ends of said frame sections in said socket members, and vertical posts between said surfaces connected to said socket members for spacing the same apart.

9. In a heavier-than-air flying machine in combination, superposed aeroplane surfaces made up in separate panels, each comprising a frame with front, rear and side bars having cloth stretched therebetween, U-shaped socket members located at the outer edges of said aeroplane-surfaces and adapted to receive the edges of two adjacent panels in the open sides thereof, and vertical posts between said surfaces connected to said socket members for spacing the same apart.

10. In a heavier-than-air flying machine in combination, superposed aeroplane-surfaces comprising a frame made up in sections, U-shaped socket members with the open side facing horizontally and adapted to receive the edges of two adjacent frame sections therein, vertical posts between said surfaces connected to said socket members for spacing the same apart, said socket members having vertically facing sockets adapted to receive said vertical posts, and wires connecting said sockets for trussing said posts.

Signed at New York city, New York, this 22 day of August, 1912.

GLENN H. CURTISS.

Witnesses:
BEATRICE MIRVIS,
E. R. JEWELL.